United States Patent
Joh et al.

(10) Patent No.: US 11,516,549 B2
(45) Date of Patent: Nov. 29, 2022

(54) ELECTRONIC APPARATUS AND CONTROL METHOD THEREOF

(71) Applicant: SAMSUNG ELECTRONICS CO., LTD., Suwon-si (KR)

(72) Inventors: Jongmyoung Joh, Suwon-si (KR); Taeung Jung, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/082,720

(22) Filed: Oct. 28, 2020

(65) Prior Publication Data

US 2021/0144443 A1 May 13, 2021

(30) Foreign Application Priority Data

Nov. 12, 2019 (KR) .................. 10-2019-0144022

(51) Int. Cl.
*H04N 21/4722* (2011.01)
*H04N 21/44* (2011.01)
(Continued)

(52) U.S. Cl.
CPC ... *H04N 21/4722* (2013.01); *H04N 21/44008* (2013.01); *H04N 21/4621* (2013.01); *H04N 21/84* (2013.01)

(58) Field of Classification Search
CPC .......... H04N 21/4126; H04N 21/4122; H04N 21/42204; H04N 21/4781; H04N 21/482
See application file for complete search history.

(56) References Cited

U.S. PATENT DOCUMENTS 1,044,810 A 11/1912 Oster
8,620,142 B2 12/2013 Morikawa
(Continued)

FOREIGN PATENT DOCUMENTS

EP 3 340 639 A1 6/2018
JP 2018-169862 A 11/2018
(Continued)

OTHER PUBLICATIONS

Communication dated Mar. 1, 2021 by the European Patent Office in European Application No. 20202732.2.
(Continued)

*Primary Examiner* — Jason Salce
(74) *Attorney, Agent, or Firm* — Sughrue Mion, PLLC

(57) ABSTRACT

An electronic apparatus includes a communication interface, a display, and a processor configured to, based on a content being received from a source apparatus via the communication interface, obtain feature information of the received content, and transmit the obtained feature information to an external server, receive, from the external server, identification information of the content, the identification information being obtained based on the transmitted feature information, based on a predetermined mode of the display being turned on according to a signal that is received from the source apparatus via the communication interface, obtain information regarding a first time point when the predetermined mode is turned on, and based on the predetermined mode of the display being turned off, obtain information regarding a second time point when the predetermined mode is turned off after the first time point.

18 Claims, 9 Drawing Sheets

(51) Int. Cl.
*H04N 21/462* (2011.01)
*H04N 21/84* (2011.01)

(56) References Cited

U.S. PATENT DOCUMENTS

| | | | |
|---|---|---|---|
| 9,003,440 B2 | 4/2015 | Sinha et al. | |
| 9,681,183 B1* | 6/2017 | Majid | H04N 21/4122 |
| 9,848,230 B2 | 12/2017 | An et al. | |
| 9,992,527 B2 | 6/2018 | An et al. | |
| 10,194,216 B2 | 1/2019 | Yabu | |
| 10,681,345 B2 | 6/2020 | Kang et al. | |
| 11,134,114 B2* | 9/2021 | Lawrence | H04L 65/4069 |
| 2010/0277510 A1* | 11/2010 | Karaoguz | G09G 3/2096 |
| | | | 345/87 |
| 2011/0199304 A1* | 8/2011 | Walley | G06F 3/0304 |
| | | | 345/158 |
| 2013/0205311 A1* | 8/2013 | Ramaswamy | H04N 21/4532 |
| | | | 725/9 |
| 2014/0101341 A1 | 4/2014 | Colenbrander | |
| 2015/0163450 A1* | 6/2015 | Miyoshi | H04N 21/4363 |
| | | | 348/441 |
| 2015/0163563 A1 | 6/2015 | An et al. | |
| 2015/0222949 A1 | 8/2015 | An et al. | |
| 2016/0006971 A1 | 1/2016 | Yum | |
| 2016/0007083 A1* | 1/2016 | Gurha | H04N 21/252 |
| | | | 725/13 |
| 2016/0019598 A1 | 1/2016 | Harrison | |
| 2017/0024470 A1 | 1/2017 | Harran | |
| 2017/0171609 A1* | 6/2017 | Koh | H04N 21/44008 |
| 2019/0018846 A1 | 1/2019 | Yeo et al. | |
| 2019/0052873 A1 | 2/2019 | Kang et al. | |
| 2019/0298255 A1* | 10/2019 | Dong | A61M 21/02 |
| 2019/0327526 A1* | 10/2019 | Navin | H04N 21/25808 |
| 2019/0342610 A1 | 11/2019 | Nielsen et al. | |
| 2020/0267437 A1* | 8/2020 | Pantos | H04N 21/4621 |
| 2021/0105530 A1* | 4/2021 | Lassure | H04N 21/23103 |
| 2021/0142761 A1* | 5/2021 | Childers | G06F 21/84 |

FOREIGN PATENT DOCUMENTS

| | | |
|---|---|---|
| JP | 2019-180103 A | 10/2019 |
| KR | 10-2015-0120963 A | 10/2015 |
| KR | 10-2016-0003400 A | 1/2016 |
| KR | 10-2017-0077730 A | 7/2017 |
| KR | 10-1918395 B1 | 11/2018 |
| KR | 10-2019-0016306 A | 2/2019 |

OTHER PUBLICATIONS

International Search Report (PCT/ISA/210) dated Feb. 15, 2021 by the International Searching Authority in International Application No. PCT/KR2020/014449.

Written Opinion (PCT/ISA/237) dated Feb. 15, 2021 by the International Searching Authority in International Application No. PCT/KR2020/014449.

* cited by examiner

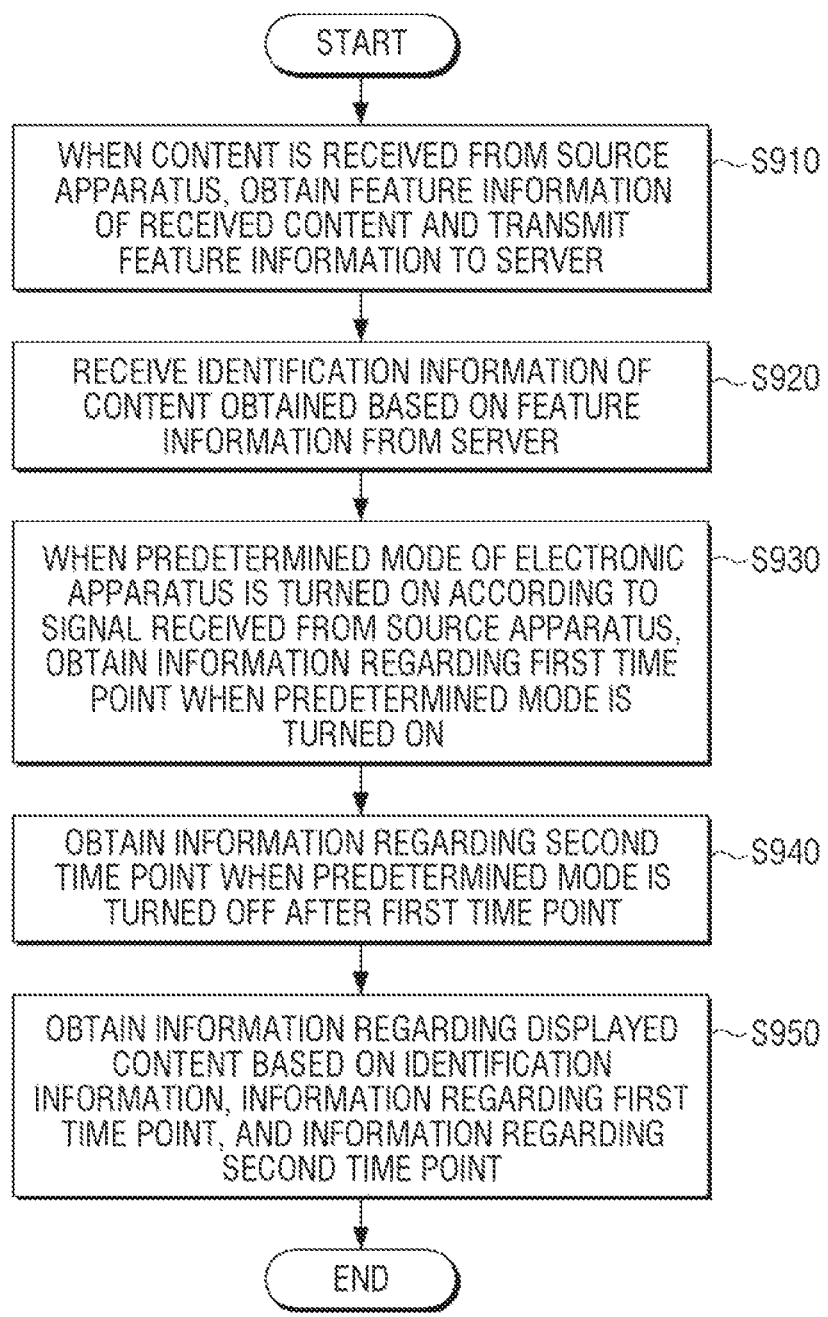

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2019-0144022, filed on Nov. 12, 2019, in the Korean Intellectual Property Office, the disclosure of which is incorporated by reference herein in its entirety.

BACKGROUND

1. Field

The disclosure relates to an electronic apparatus obtaining information regarding a content being displayed and a control method thereof.

2. Description of Related Art

In the related art, there were various methods for obtaining information regarding a content being displayed. However, the technology of the related art was mainly applied to a content, the predetermined frames of which are continuously displayed, as movies or dramas.

For example, a TV could recognize a title of a drama or a movie currently being displayed, by comparing several frames of the content currently being displayed with frames stored in a database.

However, unlike the content, the predetermined frames of which are continuously displayed, it is difficult to specify a game content by comparing with the frames stored in the database, because various play images may be displayed in accordance with user manipulation.

SUMMARY

Provided are an electronic apparatus identifying a title and reproduction time period of a content currently being displayed and a control method thereof.

Additional aspects will be set forth in part in the description that follows and, in part, will be apparent from the description, or may be learned by practice of the presented embodiments.

In accordance with an aspect of the disclosure, there is provided an electronic apparatus including a communication interface, a display, and a processor configured to, based on a content being received from a source apparatus via the communication interface, obtain feature information of the received content, and transmit the obtained feature information to an external server, receive, from the external server, identification information of the content, the identification information being obtained based on the transmitted feature information, based on a predetermined mode of the display being turned on according to a signal that is received from the source apparatus via the communication interface, obtain information regarding a first time point when the predetermined mode is turned on, based on the predetermined mode of the display being turned off, obtain information regarding a second time point when the predetermined mode is turned off after the first time point, and obtain information regarding the content that is displayed via the display, based on the received identification information, the obtained information regarding the first time point, and the obtained information regarding the second time point.

The processor may be further configured to identify a title of the displayed content, based on the identification information received from the external server, and identify a reproduction time period of the content of which the title is identified, based on the obtained information regarding the first time point and the obtained information regarding the second time point.

The processor may be further configured to obtain the identification information of the content, based on the feature information that is obtained between the first time point and the second time point, among a plurality of pieces of the identification information received from the external server.

The signal received from the source apparatus may include control information for allowing the electronic apparatus to turn on or turn off the predetermined mode based on a type of the content received from the source apparatus.

The predetermined mode may be an automatic low-latency mode (ALLM).

The control information may be provided from the source apparatus to the electronic apparatus supporting an HDMI standard of a predetermined or higher version.

Based on the type of the content being a game content, the control information may be provided from the source apparatus to the electronic apparatus.

The feature information may include any one or any combination of video feature information and audio feature information, and the processor may be further configured to capture images of a content currently being watched among the content received from the source apparatus, at a predetermined time interval, obtain the video feature information, based on pixel values of the captured images, obtain frequency information of acoustic information of the content currently being watched, at the predetermined time interval, and obtain the audio feature information, based on the obtained frequency information.

Based on a number of pieces of the identification information of the content obtained based on the video feature information being more than one, the audio feature information may be additionally used for obtaining identification information corresponding to the content currently being watched among a plurality of pieces of the obtained identification information.

The processor may be further configured to obtain the video feature information from a predetermined number of recently captured images among the captured images.

In accordance with an aspect of the disclosure, there is provided a method of controlling an electronic apparatus, the method including, based on a content being received from a source apparatus, obtaining feature information of the received content, and transmitting the obtained feature information to an external server, receiving, from the external server, identification information of the content, the identification information being obtained based on the transmitted feature information, based on a predetermined mode of the display being turned on according to a signal that is received from the source apparatus, obtaining information regarding a first time point when the predetermined mode is turned on, based on the predetermined mode of the display being turned off, obtaining information regarding a second time point when the predetermined mode is turned off after the first time point, and obtaining information regarding the content that is displayed, based on the received identification information, the obtained information regarding the first time point, and the obtained information regarding the second time point.

The obtaining the information regarding the content may include identifying a title of the displayed content, based on the identification information received from the external server, and identifying a reproduction time of the content of which the title is identified, based on the obtained information regarding the first time point and the obtained information regarding the second time point.

The method may further include obtaining the identification information of the content, based on the feature information that is obtained between the first time point and the second time point, among a plurality of pieces of the identification information received from the external server.

The signal received from the source apparatus may include control information for allowing the electronic apparatus to turn on or turn off the predetermined mode based on a type of the content received from the source apparatus.

The predetermined mode may be an automatic low-latency mode (ALLM).

The control information may be provided from the source apparatus to the electronic apparatus supporting an HDMI standard of a predetermined or higher version.

Based on the type of the content being a game content, the control information may be provided from the source apparatus to the electronic apparatus.

The feature information may include any one or any combination of video feature information and audio feature information, and the obtaining the feature information may include capturing images of a content currently being watched among the content received from the source apparatus, at predetermined time interval, obtaining the video feature information, based on pixel values of the captured images, obtaining frequency information of acoustic information of the content currently being watched, at the predetermined time interval, and obtaining the audio feature information, based on the obtained frequency information.

Based on a number of pieces of the identification information of the content obtained based on the video feature information being more than one, the audio feature information may be additionally used for obtaining identification information corresponding to the content currently being watched among a plurality of pieces of the obtained identification information.

The obtaining the video feature information may include obtaining the video feature information from a predetermined number of recently captured images the captured images.

In accordance with an aspect of the disclosure, there is provided a non-transitory computer-readable storage medium storing instructions that, when executed by at least one processor of an electronic apparatus, cause the at least one processor to identify whether a predetermined mode of a display of the electronic apparatus is turned on, based on a signal that is received from a source apparatus, based on the predetermined mode of the display being identified to be turned on, obtain a first time point at which the predetermined mode of the display is turned on, obtain feature information from the received signal, transmit the obtained feature information to an external server, receive, from the external server, identification information of content corresponding to the transmitted feature information, based on the predetermined mode of the display being identified to be turned off, obtain a second time point at which the predetermined mode of the display is turned off, after the first time point, and obtain information of the content that is displayed via the display, from a portion of the received identification information, the portion corresponding to a time period from the obtained first time point to the obtained second time point.

The predetermined mode may include an automatic low-latency mode (ALLM), and the information of the content may include either one or both of a title and a type.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a flowchart for explaining a method of controlling an electronic apparatus, according to an embodiment.

DETAILED DESCRIPTION

Figure 1:
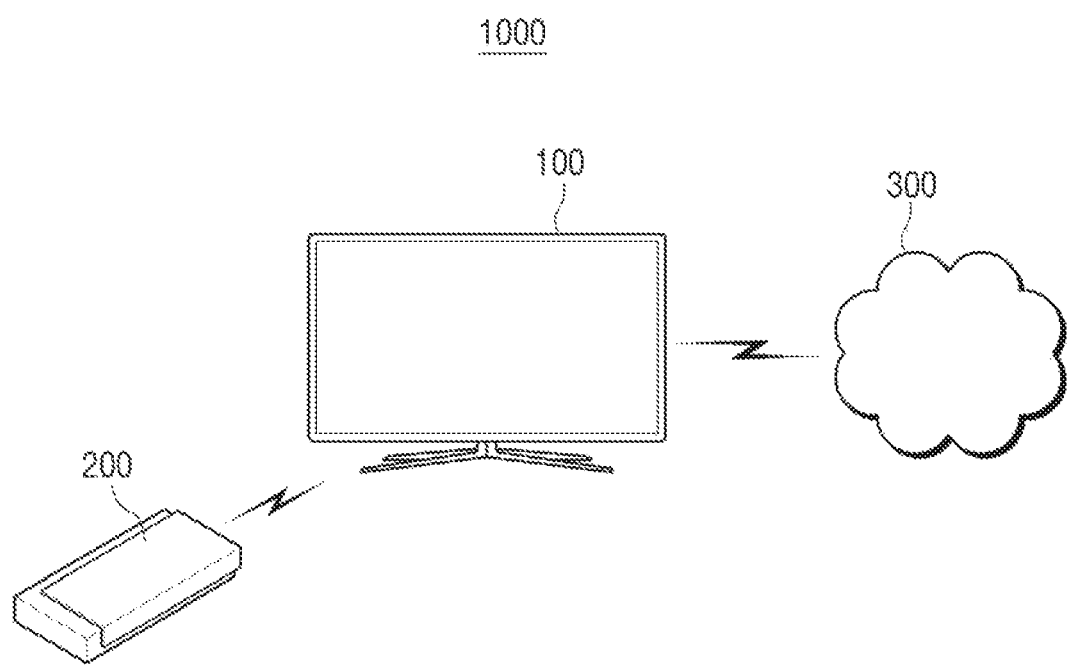
FIG. 1 is a view for schematically explaining a configuration of an electronic system according to an embodiment.

Hereinafter, the disclosure will be described in detail with reference to the accompanying drawings.

The disclosure will be described in detail after briefly explaining the terms used in the specification.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a case, there is also a term arbitrarily selected by the applicant, in which case the meaning will be described in detail in the description of the disclosure. Therefore, the terms used in the disclosure may be defined based on the meanings of the terms themselves and the contents throughout the disclosure, rather than the simple names of the terms.

The embodiments of the disclosure may be variously changed and include various embodiments, and the embodiments will be shown in the drawings and described in detail in the description. However, it may be understood that this is not to limit the scope of the embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

The expression such as "A and/or B" may be understood to represent any one of "A", "B", or "A and B".

The expressions "first," "second" and the like used in the disclosure may denote various elements, regardless of order and/or importance, and may be used to distinguish one element from another, and does not limit the elements.

If it is described that an element (e.g., first element) is "operatively or communicatively coupled with/to" or is "connected to" another element (e.g., second element), it may be understood that the element may be connected to the other element directly or through still another element (e.g., third element).

A term such as "module" or a "unit" in the disclosure may perform at least one function or operation, and may be implemented as hardware, software, or a combination of hardware and software. Further, except for when each of a plurality of "modules", "units", and the like may be realized in an individual hardware, the components may be integrated in at least one module and be implemented in at least one processor. In the disclosure, a term "user" may refer to a person using an electronic apparatus or an apparatus (e.g., an artificial intelligence electronic apparatus) using an electronic apparatus.

Hereinafter, with reference to the accompanying drawings, embodiments of the disclosure will be described in detail so that those skilled in the art can easily make and use the embodiments in the technical field of the disclosure. But, the disclosure may be implemented in various different forms and is not limited to the embodiments described herein. In addition, in the drawings, the parts not relating to the description may be omitted for clearly describing the disclosure, and the same reference numerals are used for the same parts throughout the specification.

Hereinafter, an embodiment of the disclosure will be described in detail with reference to the accompanying drawings.

FIG. 1 is a view for schematically explaining a configuration of an electronic system according to an embodiment.

Referring to FIG. 1, an electronic system 1000 according to an embodiment of the disclosure may include an electronic apparatus 100, a source apparatus 200, and a server 300.

The electronic apparatus 100 may be a display apparatus that receives an image signal from the source apparatus 200 and displays a content including the received image signal. For example, the electronic apparatus 100 may be implemented in various forms including a display such as a TV, a smart TV, a smartphone, a tablet PC, a mobile phone, a video phone, an electronic book reader, a desktop PC, a laptop PC, a netbook computer, a PDA, a portal multimedia player (PMP), an MP3 player, a medical device, a camera, or a wearable device.

The source apparatus 200 may be an apparatus that transmits a source image and a signal including information regarding the source image to the electronic apparatus 100. For example, the source apparatus 200 may be implemented in various forms such as a game console (e.g., XBOX™, PLAYSTATION™), a smartphone, a table PC, a desktop PC, a laptop PC, a netbook computer, a wearable device, a set top box, and a storage device such as a USB.

The server 300 may be an apparatus that stores and manages information regarding various contents. For example, the server 300 may generate and store feature information of a content. The feature information may refer to unique information for distinguishing the corresponding content from other contents, and may include, for example, video feature information generated based on a video signal and audio feature information generated based on an audio signal. This will be described below in detail.

If the electronic apparatus 100 does not have information regarding a content currently being displayed, the electronic apparatus 100 may obtain feature information regarding the content currently being displayed, and transmit the feature information to the server 300, and the server 300 may identify which content, the content currently being displayed on the electronic apparatus 100, is by comparing the received feature information with information stored in the server 300, and transmit identification information to the electronic apparatus 100. In addition, the electronic apparatus 100 may obtain reproduction time information of the content currently being displayed based on information included in a signal received from the source apparatus 200.

An embodiment of obtaining information regarding the content being reproduced by the electronic apparatus 100 as described above will be described below in detail.

Figure 2:
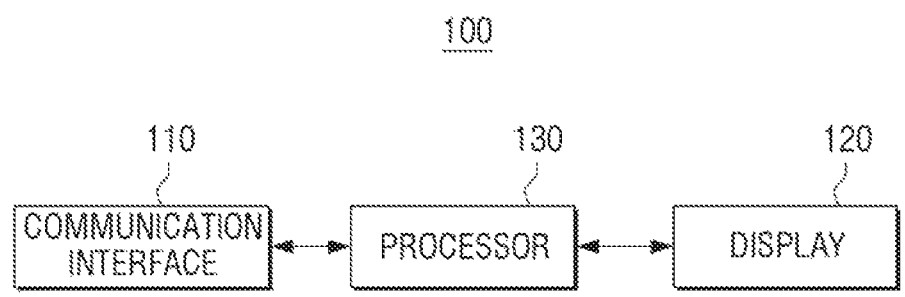
FIG. 2 is a block diagram for explaining operations of an electronic apparatus according to an embodiment.

FIG. 2 is a block diagram for explaining operations of an electronic apparatus according to an embodiment.

Referring to FIG. 2, the electronic apparatus 100 may include a communication interface 110, a display 120, and a processor 130.

The communication interface 110 may include circuitry and is an element capable of communicating with the source apparatus 200 and the server 300.

The communication interface 110 may communicate with the source apparatus 200 and the server 300 based on a wired or wireless communication method.

According to an embodiment, if the communication interface 110 communicates with the outside by a wired communication method, the communication interface 110 may be implemented as a port provided in the electronic apparatus 100. The communication interface 110 may be implemented as an HDMI port to communicate with the source apparatus 200. In this case, the source apparatus 200 may also include a HDMI port. Accordingly, the electronic apparatus 100 and the source apparatus 200 may communicate with each other via each HDMI port and a high definition multimedia interface (HDMI) cable connecting these. However, there is no limitation thereto, and the communication interface 110 may communicate with the source apparatus 200 via a low voltage differential signals (LVDS) cable, a digital visual interface (DVI) cable, a D-subminiature (D-SUB) cable, video graphics array (VGA) cable, a V-by-One cable, or an optical cable.

According to another embodiment, the communication interface 110 may communicate with the source apparatus 200 and the server 300 via wireless communication. In this case, the communication interface 110 may include a Wi-Fi module, a Bluetooth module, an infrared (IR) module, a local area network (LAN) module, Ethernet module, and the like. Each communication module may be implemented as one hardware chip. In addition to the communication method described above, the wireless communication module may include at least one communication chip performing communication based on various wireless communication standards such as Zigbee, Universal Serial Bus (USB), Mobile Industry Processor Interface Camera Serial Interface (MIPI CSI), 3rd Generation (3G), 3rd Generation Partnership Project (3GPP), Long Term Evolution (LTE), LTE Advanced (LTE-A), 4th Generation (4G), 5th Generation (5G), and the like. However, this is an embodiment, the communication interface 110 may use at least one communication module among various communication modules.

The communication interface communicating with the source apparatus 200 and the communication interface communicating with the server 300 may be implemented as interfaces different from each other. For example, the communication interface 110 may include a first communication interface 110-1 communicating with the source apparatus 200 and a second communication interface 110-2 communicating with the server 300. In this case, the first communication interface 110-1 may communicate with the source apparatus 200 via wired communication and the second communication interface 110-2 may communicate with the serve 300 via wireless communication. The first communication interface 110-1 may be implemented as an HDMI port but is not limited thereto.

The first communication interface 110-1 may receive an image signal from the source apparatus 200. The image signal herein may include contents and signals including information regarding the contents. The second communication interface 110-2 may transmit feature information of a content to the server 300 and receive identification information of the content obtained based on the feature information from the server 300. This will be described below in detail.

The display 120 is an element that displays the content received from the source apparatus 200.

The display 120 may be implemented as various displays such as a liquid crystal display (LCD), an organic light-emitting diode (OLED), a Liquid Crystal on Silicon (LCoS), a Digital Light Processing (DLP), a quantum dot (QD) display panel, quantum dot light-emitting diodes (QLED), and a micro light-emitting diode (LED).

The display 120 may be implemented as a touch screen type having a layered structure with a touch pad. The touch screen may be configured to detect a touch input pressure, in addition to a touch input position and area.

The processor 130 may be electrically connected to a memory and control operations of the electronic apparatus 100.

According to an embodiment of the disclosure, the processor 130 may receive a content from the source apparatus 200 via the communication interface 110. In some cases, the electronic apparatus 100 may receive information regarding a content (e.g., a title, a type, reproduction time period of the content) from the source apparatus 200, but the disclosure will be described by assuming information regarding a content currently being reproduced or to be reproduced is obtained, because clear information regarding the content could not be received from the source apparatus 200.

The processor 130 may obtain feature information of the content received from the source apparatus 200 and transmit the feature information to the external server 300. The feature information may refer to unique information of the content that allows to distinguish the corresponding content from another content and the feature information may include any one or any combination of video feature information and audio feature information. The video feature information may be information extracted from a video signal not including audio information and may be video fingerprint information. In addition, the audio feature information may be information extracted from an audio signal and may be audio fingerprint information.

The video fingerprint information may be character string information generated based on a pixel value of one frame included in the video signal. Such a character string varies depending on the pixel value according to a pixel position, and accordingly, the same character string may be generated only in a case of the same frame. Thus, the video fingerprint may be feature information that allows to distinguish the corresponding frame from another frame.

The audio fingerprint information may be character string information generated based on acoustic frequency information included in one section of the audio signal. Such a character string varies depending on the frequency information, and accordingly, the same character string may be generated only in a case of the same acoustic signal. Thus, the audio fingerprint may be feature information that allows to distinguish an acoustic frequency of the corresponding section from another acoustic frequency.

The processor 130 may capture an image of a content currently being watched among contents received from the source apparatus 200 at intervals of a predetermined period of time. For example, the processor 130 may capture a frame of a content displayed via the display 120 at an interval of 500 ms. Then, the processor 130 may obtain video feature information based on a pixel value of the captured image.

For example, the processor 130 may divide all pixels in the captured image, that is, one captured frame, into blocks including n×m pixels. Then, the processor 130 may calculate a pixel value of some or all of blocks among the divided blocks. The processor 130 may generate a character string corresponding to the calculated pixel value and the generated character string may be video fingerprint. The processor 130 may obtain the video fingerprint that is, the video feature information, by the method described above.

The processor 130 may obtain the video feature information from the predetermined number of images captured recently among a plurality of images captured at predetermined time interval. For example, when obtaining the video feature information from the plurality of all of images captured at predetermined time interval and transmitting it to the server 300, an identification accuracy regarding the content currently being reproduced on the display 120 may be improved, but the processing amount of the processor 130 may unnecessarily increase. Therefore, the video feature information may be obtained from the minimum number of images for identifying the content and obtain the video feature information from the image recently captured, by considering real-time of the content currently being reproduced. For example, if the predetermined number thereof is 3, the processor 130 may obtain video feature information only from three images recently captured.

In addition, the processor 130 may obtain an acoustic signal of a content currently being watched at predetermined time interval. For example, the processor 130 may obtain frequency information of the acoustic signal of the content output via a speaker at an interval of 500 ms. Then, the processor 130 may obtain audio feature information based on the obtained frequency information. The processor 130 may analyze a waveform of the obtained frequency information and generate a character string corresponding to the analyzed waveform. The character string generated as described above may be the audio fingerprint. The processor 130 may obtain the audio feature information from the predetermined number of pieces of frequency information recently obtained among the pieces of frequency information obtained at predetermined time interval, as the video feature information.

If the number of pieces of identification information of the content obtained based on the video feature information is more than one, the audio feature information may be information additionally used for obtaining identification information corresponding to the content currently being watched among the plurality of pieces of identification information. This will be described in detail with reference to FIGS. 5 and 6.

The processor 130 may transmit the feature information obtained in the above embodiments to the server 300.

In an example, the processor 130 may transmit the feature information to the server 300 at predetermined time interval, and the interval of a predetermined period of time herein may be the same as the interval of time when the feature information is obtained, but is not limited thereto, and the feature information may be transmitted to the server 300 at an interval of time different from the interval of time when the feature information is obtained.

However, there is no limitation thereto, and if a content identification request is input from a user or a feature information transmission request signal is received from the server 300, the processor 130 may transmit the obtained feature information to the server 300.

Then, the server 300 may compare the feature information transmitted from the electronic apparatus 100 with feature information stored in a database of the server 300. For example, if the video fingerprint information corresponding to three frames included in one content is transmitted from the electronic apparatus 100, the server 300 may search for a content including three pieces of video fingerprint information from the database. In an example, the server 300 may identify a content including any one or any combination of three pieces of video fingerprint information as a candidate content. In this case, if the identified candidate contents are different from each other, the server 300 may identify a content having a comparatively larger number of pieces of video fingerprint information matching with the three pieces of video fingerprint information as a content corresponding to the video fingerprint information transmitted form the electronic apparatus 100. For example, if movie contents different from each other are divided into first and second episodes, introduction images may be the same as each other. Accordingly, the server 300 may identify a content having a comparatively larger number of pieces of matching video fingerprint information among the plurality of identified candidate contents, as a content corresponding to the feature information transmitted from the electronic apparatus 100. Accordingly, an accuracy of identification of the content corresponding to the video fingerprint transmitted by the electronic apparatus 100 may increase.

In addition, because the server 300 may not store the video fingerprint of all frames regarding one content, the server 300 may not find a content matching with all pieces of the video fingerprint transmitted from the electronic apparatus 100. Accordingly, the server 300 may search for a content having only one piece of fingerprint matching with the plurality pieces of video fingerprint transmitted from the electronic apparatus 100 and identify the content as a candidate content. In the subsequent process, as described above, a content having a comparatively larger number of matching video fingerprint information may be identified as a content corresponding to the video fingerprint information transmitted from the electronic apparatus 100.

In other words, the server 300 may identify a content having a high similarity by comparing the feature information transmitted from the electronic apparatus 100 with information stored in the database. The server 300 may obtain the information regarding the identified content from the database and transmit the obtained identification information of the content to the electronic apparatus 100. The identification information of the content may include title information, type information, production year information, production country information, personal information, and the like of the content.

The processor 130 may receive the identification information of the content obtained based on the feature information from the server 300.

The processor 130 may receive a signal from the source apparatus 200 via the communication interface 110. The signal herein may be a signal including a content and control information. The content may be a source image provided by the source apparatus 200 and the control information may include instruction information for changing setting information of the display 120.

For example, the signal received from the source apparatus 200 may include control information for allowing the electronic apparatus 100 to turn on or off a predetermined mode based on a type of the content provided by the source apparatus 200. If the type of the content is a game content, the predetermined mode may be an automatic low-latency mode (ALLM). The ALLM may be a mode comparatively rapidly displaying a response to an input on the display. The game content may be a content requiring real-time user manipulation, unlike the contents such as a movie or a drama. Thus, it is necessary to rapidly reflect a response to a user manipulation on the display 120, and accordingly, it is necessary to comparatively reduce response time to the user input. Therefore, if the content transmitted to the electronic apparatus 100 is identified as a game content, the source apparatus 200 may include the control information for turning on the ALLM in the signal transmitted to the electronic apparatus 100.

Such control information may be information provided to the electronic apparatus 100 supporting HDMI standard of a predetermined or higher version. For example, the control information may be provided to the electronic apparatus 100 supporting standard of HDMI 2.0 or higher version. In this case, the electronic apparatus 100 and the source apparatus 200 may include an HDMI 2.0 port. However, there is no limitation thereto, and if the version supported by the electronic apparatus 100 is lower than HDMI 2.0, the ALLM may not be turned on in the electronic apparatus 100, even if the control information is provided from the source apparatus 200.

Herein, the HDMI 2.0 is standard optimal to ultra-high resolution environment called 4K or UHD (ultra HD). A maximum bandwidth supported by the HDMI 2.0 is 18 Gbps and an image smoothly moving at 60 Hz in a maximum resolution of 4,096×2,160 (2160p) may be transmitted.

The HDMI standard may include information block of a vender specific data block (VSDB), and the VSDB may include Audio/Video Latency information, CEC Physical address information, Color bit information, highest TMDS frequency information, or the like. The Color bit information herein may refer to color information and the highest Transition Minimized Differential Signaling (TMDS) frequency information may refer to resolution information.

If the type of the content transmitted to the electronic apparatus 100 is identified as a game content, the source apparatus 200 may include automatic low-latency mode (ALLM) control information for adjusting the Latency included in the VSDB.

The HDMI port of each version may have backward compatibility. Accordingly, the source apparatus 200 of upper standard may be connected to the electronic apparatus 100 of lower standard and vice versa. However, in this case, both apparatuses may use only functions corresponding to the lower standard. In an example, even if the source apparatus 200 supports the HDMI 2.0, when the electronic apparatus 100 supports the HDMI 1.4 standard, only the function of HDMI 1.4 may be used. Accordingly, to turn on the ALLM on the electronic apparatus 100, the standard of the electronic apparatus 100 and the source apparatus 200 may be at least HDMI 2.0.

If the predetermined mode of the display 120 is turned on according to the signal received from the source apparatus 200, the processor 130 may obtain information regarding a first time point when the predetermined mode is turned on. The processor 130 may store the information regarding the first time point when the predetermined mode is turned on in a memory.

In addition, the processor 130 may obtain information regarding a second time point when the predetermined mode is turned off after the first time point. The processor 130 may store the information regarding the second time point when the predetermined mode is turned off in the memory.

In an example, the information regarding the first time point when the predetermined mode is turned on and the information regarding the second time point when the predetermined mode is turned off may be time information of the corresponding time point. For example, the information regarding the first time point may be time information of the first time point such as 16:30 on Sep. 1, 2019. In another example, the information regarding the first time point may be a start time point of a stopwatch for measuring a period of time. In this case, the information regarding the second time point when the predetermined mode is turned off may refer to the period of time itself. For example, the first time point may be a time point when the stopwatch starts that is 0, and the second time point may be a time point when the stopwatch ends that is, for example, 2 hours and 30 minutes.

In an example, the predetermined mode may be turned off based on the signal including the control information for turning the predetermined mode off.

In another example, the signal including the control information for turning the predetermined mode on may be periodically transmitted to the electronic apparatus 100 from the first time point from the source apparatus 200, and the predetermined mode may be turned off, if the control information for turning the predetermined mode on is no longer transmitted.

Accordingly, the processor 130 may identify the information regarding the first time point when the predetermined mode is turned on and the information regarding the second time point when the predetermined mode is turned off. In other words, the processor 130 may identify a period of time during which the predetermined mode is turned on.

The processor 130 may obtain information regarding a content displayed via the display 120 based on the identification information, the information regarding the first time point, and the information regarding the second time point.

The information regarding the content herein may include any one or any combination of a title, a type, or reproduction time period of the content.

The processor 130 may identify the title of the content displayed via the display 120 based on the identification information. The identification information herein may be information obtained by the server 300 by comparing the feature information received from the electronic apparatus 100 and the feature information stored in the server 300, and may be information transmitted by the server 300 to the electronic apparatus 100. The processor 130 may identify type information, production year information, production country information, personal information, and the like based on the identification information, in addition to the title of the content.

In addition, the processor 130 may identify the reproduction time period of the content identified based on the information regarding the first time point and the information regarding the second time point. The processor 130 may identify that the identified content is started to be reproduced at the first time point and ended at the second time point based on the identification information. Accordingly, the processor 130 may obtain total time information during which the content is reproduced.

The processor 130 may obtain identification information of the content among the plurality of pieces of identification information received from the server 300 based on the feature information obtained between the first time point and the second time point. For example, the feature information is obtained before the first time point and transmitted to the server 300, the identification information received from the server 300 is not for the content reproduced via the display 120 between the first time point and the second time point, and accordingly, the processor 130 may identify only the content based on the feature information obtained between the first time point and the second time point as a content reproduced between the first time point and the second time point. This will be described in detail with reference to FIG. 8.

It is described that the processor 130 obtains the feature information of the content currently being reproduced, but there is no limitation thereto, and the processor 130 may obtain feature information of a content to be reproduced and receive identification information regarding this from the server 300.

Figure 3:
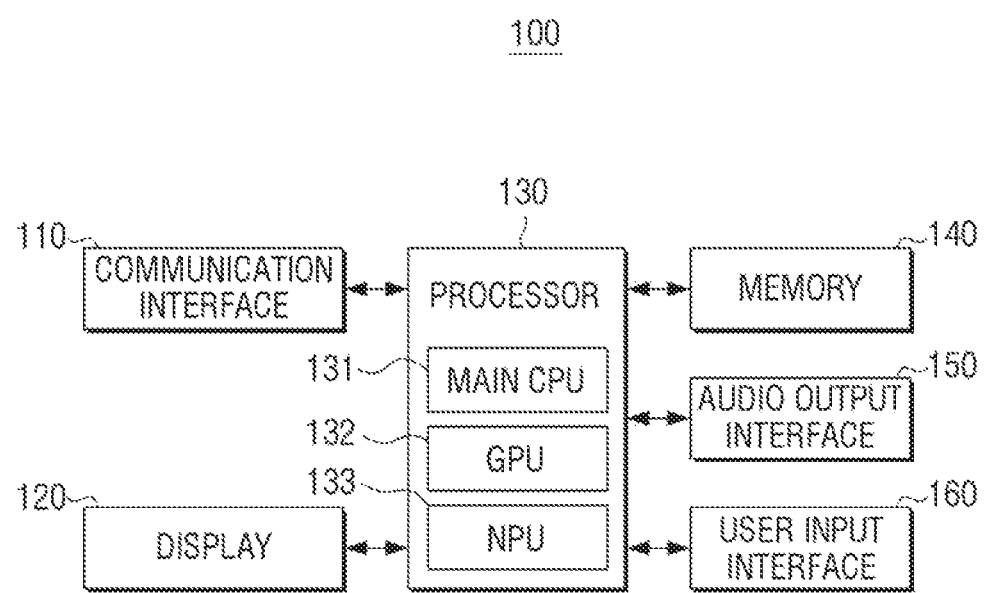
FIG. 3 is a block diagram for explaining a configuration of an electronic apparatus according to an embodiment.

FIG. 3 is a block diagram for explaining a configuration of an electronic apparatus according to an embodiment.

Referring to FIG. 3, the electronic apparatus 100 may include the communication interface 110, the display 120, the processor 130, a memory 140, an audio output interface 150, and a user input interface 160. The detailed description regarding parts of the configuration illustrated in FIG. 3 overlapped with the configuration illustrated in FIG. 2 will not be repeated.

The processor 130 may control the operations of the electronic apparatus 100 using various programs stored in the memory 140. The processor 130 may include a graphic processor 132 for graphic processing corresponding to an image. The processor 130 may be implemented as a System On Chip (SoC) including a core and a graphics processing unit (GPU) 132. The processor 130 may be a single-core processor, a dual-core processor, a triple-core processor, a quad-core processor, or other multi-core processors.

The processor 130 may include a main central processing unit (CPU) 131, the GPU 132, and a numeric processing unit (NPU) 133.

The main CPU 131 may execute the booting by using the O/S stored in the memory 140 by accessing the memory 140. The main CPU 131 may execute various operations using various programs, contents, data, and the like stored in the memory 140. According to an embodiment, the main CPU 131 may copy a program in the memory 140 to a RAM and access the RAM to execute the corresponding program, in accordance with instructions stored in the ROM.

The GPU 132 may correspond to a high-performance processor for graphic processing and may be a specialized electronic circuit that is designed to rapidly process and change the memory to accelerate image generation in a frame buffer to be output on a screen. In addition, the GPU 132 may refer to a visual processing unit (VPU).

The NPU 133 may correspond to an AI chipset (or AI processor) and may be an AI accelerator. The NPU 133 may correspond to a processor chip optimal for deep neural network. The NPU 133 may correspond to a processor executing a deep learning model instead of the GPU 132, and the NPU 133 may correspond to a processor executing a deep learning model together with the GPU 132.

The memory 140 may be electrically connected to the processor 130 and store data for embodiments.

The memory 140 may be implemented in a form of a memory embedded in the electronic apparatus 100 or implemented in a form of a memory detachable from the electronic apparatus 100 according to data storage purpose. For example, data for operating the electronic apparatus 100 may be stored in a memory embedded in the electronic apparatus 100, and data for an extended function of the electronic apparatus 100 may be stored in a memory detachable from the electronic apparatus 100. The memory embedded on the electronic apparatus 100 may be implemented any one or any combination of a volatile memory (e.g., a dynamic RAM (DRAM), a static RAM (SRAM), a synchronous dynamic RAM (SDRAM), or the like), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD)), and the memory detachable from the electronic apparatus 100 may be implemented in a form of a memory card (e.g., compact flash (CF), secure digital (SD), micro secure digital (Micro-SD), mini secure digital (Mini-SD), extreme digital (xD), multimedia card (MMC), or the like), an external memory connectable to a USB port (e.g., USB memory), and the like.

According to an embodiment, the memory 140 may store the feature information obtained by the processor 130. The memory 140 may store any one or any combination of the video fingerprint or the audio fingerprint.

The memory 140 may store the information regarding the first time point and the information regarding the second time point. In addition, the memory 140 may also store information regarding a time point when the feature information is obtained.

The audio output interface 150 may be an element for outputting an audio signal corresponding to a video signal. The audio output interface 150 may be implemented as a speaker and may also be implemented as an external element of the electronic apparatus 100 such as a sound bar.

The user input interface 160 may be an element for receiving various user instructions and information. The processor 130 may execute a function corresponding to a user instruction input via the user input interface 160 and store the information input via the user input interface 160 in the memory 140.

The user input interface 160 may include a microphone for receiving the user instruction as a voice or may be implemented as the display 120 for receiving the user instruction by touching.

In addition, the user input interface 160 may receive a user instruction or a signal including information regarding an operation from a separate control apparatus for controlling the electronic apparatus 100.

Figure 4:
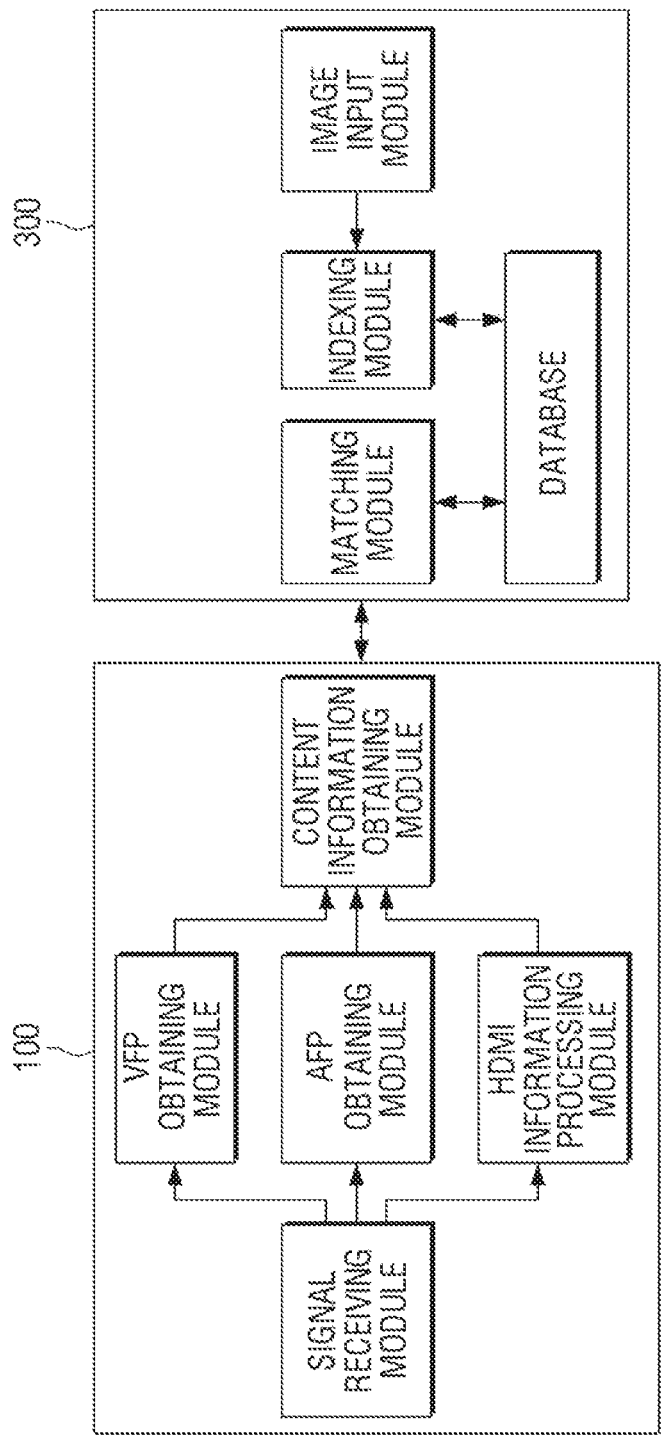
FIG. 4 is a block diagram for explaining operations between an electronic apparatus and a server, according to an embodiment.

FIG. 4 is a block diagram for explaining operations between an electronic apparatus and a server, according to an embodiment.

The electronic apparatus 100 may include a signal receiving module, a video fingerprint (VFP) obtaining module, an audio fingerprint (AFP) obtaining module, an HDMI information processing module, and a content information obtaining module. The above modules may be stored in the memory 140 and loaded to the processor 130 and executed according to the control of the processor 130.

The signal receiving module may receive an image signal from the source apparatus 200. The image signal may include a content and control information regarding the content. The signal receiving module may divide the image signal received from the source apparatus 200 into a video signal and an audio signal. Then, the signal receiving module may transmit the video signal to the video fingerprint obtaining module, transmit the audio signal to the audio fingerprint obtaining module, and transmit the control information to the HDMI information processing module.

The video fingerprint obtaining module may obtain video fingerprint from the video signal at predetermined time interval. The video fingerprint obtaining module may obtain video fingerprint including character strings based on a pixel value included in the video signal. The obtained video fingerprint information may be transmitted to the content information obtaining module.

The audio fingerprint obtaining module may obtain the audio fingerprint from the audio signal at predetermined time interval. The audio fingerprint obtaining module may obtain audio fingerprint including character string based on frequency information of an acoustic signal included in the audio signal. The obtained audio fingerprint information may be transmitted to the content information obtaining module.

The HDMI information processing module may monitor whether the ALLM is turned on in the electronic apparatus 100 based on the control information transmitted from the source apparatus 200 based on the HDMI standard of the predetermined or higher version. The HDMI information processing module may transmit information regarding a first time point when the ALLM is turned on to the content information obtaining module.

In addition, the HDMI information processing module may monitor whether the turned-on ALLM is turned off. The HDMI information processing module may transmit information regarding a second time point when the ALLM is turned off after the first time point to the content information obtaining module.

The content information obtaining module may store the information regarding the first time point and the information regarding the second time point transmitted from the HDMI information processing module in the memory 140, and identify that the content of the predetermined type is reproduced between the first time point and the second time point. In an example, the content information obtaining module may identify that a game content is reproduced between the first time point and the second time point.

The content information obtaining module may transmit the video fingerprint information and the audio fingerprint information transmitted from the video fingerprint obtaining module and the audio fingerprint obtaining module to the server 300. In an example, the content information obtaining module may transmit any one or any combination of the video fingerprint information or the audio fingerprint information recently received to the server 300. However, there is no limitation thereto, and the content information obtaining module may transmit all pieces of video fingerprint information and the audio fingerprint information transmitted from the video fingerprint obtaining module and the audio fingerprint obtaining module to the server 300.

The operations of the signal receiving module, the video fingerprint (VFP) obtaining module, the audio fingerprint (AFP) obtaining module, the HDMI information processing module, and the content information obtaining module may be performed by the processor 130 and the modules described above may collectively refer to the processor 130. In addition, the names of the modules and the types of the modules are an example, and the modules may be implemented as modules with various names and various types.

The server 300 may include a matching module, an indexing module, a database, and an image input module.

The server 300 may identify a content reproduced by the electronic apparatus 100 based on any one or any combination of the video fingerprint or the audio fingerprint transmitted from the electronic apparatus 100.

The matching module may determine a content matching with any one or any combination of the video fingerprint or the audio fingerprint transmitted from the electronic apparatus 100. For example, the matching module may identify a content matching with any one or any combination of the video fingerprint or the audio fingerprint transmitted from the electronic apparatus 100 based on the video fingerprint information and the audio fingerprint information stored in the database. The matching may refer to a case in which the video fingerprint is the same or similar to another video fingerprint, and a case in which the audio fingerprint is the same or similar to another audio fingerprint.

The database may store any one or any combination of the video fingerprint or the audio fingerprint generated regarding the at least one content. For example, the database may store the video fingerprint or the audio fingerprint of the game content or store the video fingerprint or the audio fingerprint generated regarding real-time broadcasting service.

The indexing module may index each of a video and a sound. The indexing module may generate a video fingerprint based on a video signal according to an image signal transmitted via the image input module and generate an audio fingerprint based on the audio signal according to the transmitted image signal. The generation of the video fingerprint and the generation of the audio fingerprint may refer to extraction of the video fingerprint and extraction of the audio fingerprint.

The indexing module may index each of the video fingerprint and the audio fingerprint generated and store these in the database.

The image input module may receive a content signal including a game content relevant signal and a broadcasting service signal. The image input module may divide the received signal into a video signal and an audio signal. The image input module may transmit the divided video signal and audio signal to the indexing module. The game content relevant signal or the broadcasting service signal may be signals transmitted from the source apparatus 200 or an external apparatus.

In a case of real-time broadcasting, a real-time broadcasting service signal may be transmitted to the image input module of the server 300, before the electronic apparatus 100. Accordingly, the video fingerprint and the audio fingerprint may be obtained from the image signal including the broadcasting service signal and stored in the database, before the electronic apparatus 100. Therefore, even if a content identification request regarding the real-time broadcasting is received from the electronic apparatus 100, the server 300 may identify a content corresponding to the real-time broadcasting based on any one or any combination of the video fingerprint or the audio fingerprint stored in the database.

Figure 5:
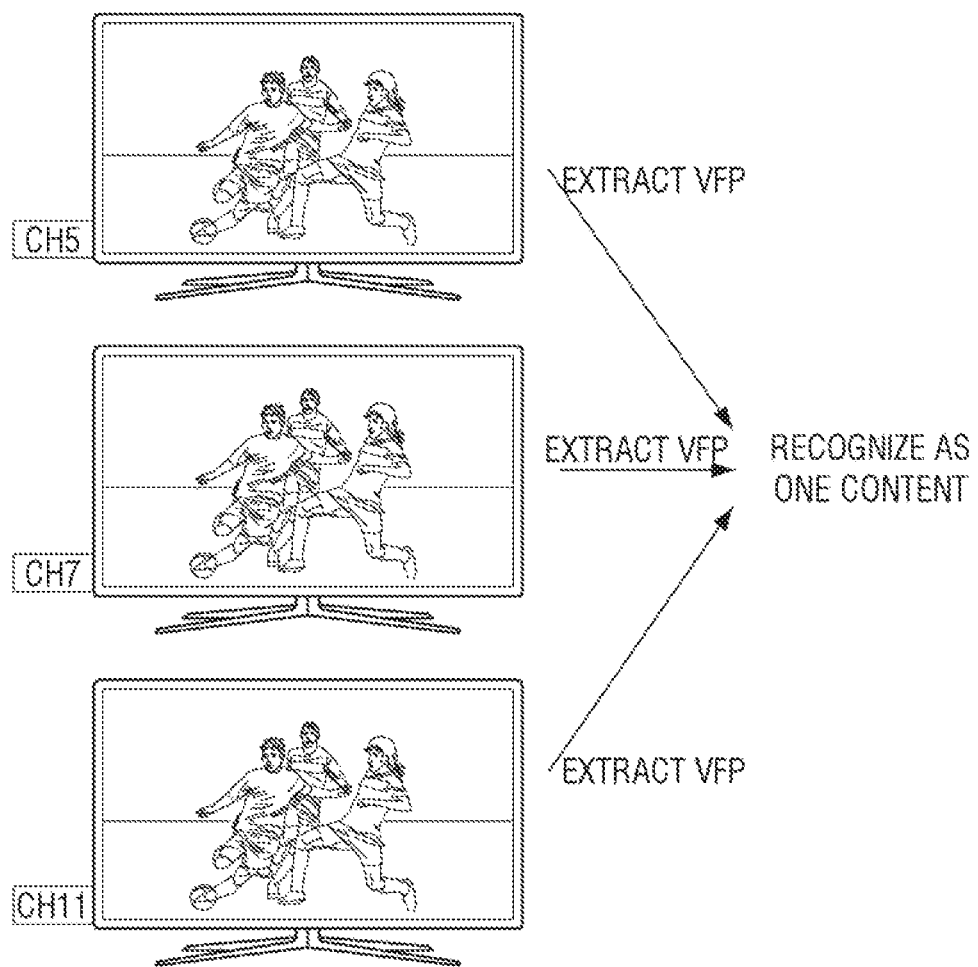
FIG. 5 is a view for explaining an operation of distinguishing contents, in a case in which the same video is reproduced on a plurality of channels, according to an embodiment.

FIG. 5 is a view for explaining an operation of distinguishing contents, in a case in which the same video is reproduced on a plurality of channels, according to an embodiment.

As illustrated in FIG. 5, it is assumed that videos of the contents reproduced on a plurality of channels are the same. In such a case, the electronic apparatus 100 may obtain video fingerprint information obtained from Channel 5, Channel 7, and Channel 11 and transmit these to the server 300. Because a plurality of video fingerprints transmitted from the electronic apparatus 100 are the same, the server 300 may recognize the contents of the channels as one content.

However, for example, assuming that the contents being reproduced on Channel 5, Channel 7, and Channel 11 are soccer games, these may be identified as different contents, because numbers, commentators, and the like of the channels, on which the contents are reproduced, are different from each other. Accordingly, an embodiment of identifying the content more accurately using the audio fingerprint information in this case will be described below in detail with reference to FIG. 6.

Figure 6:
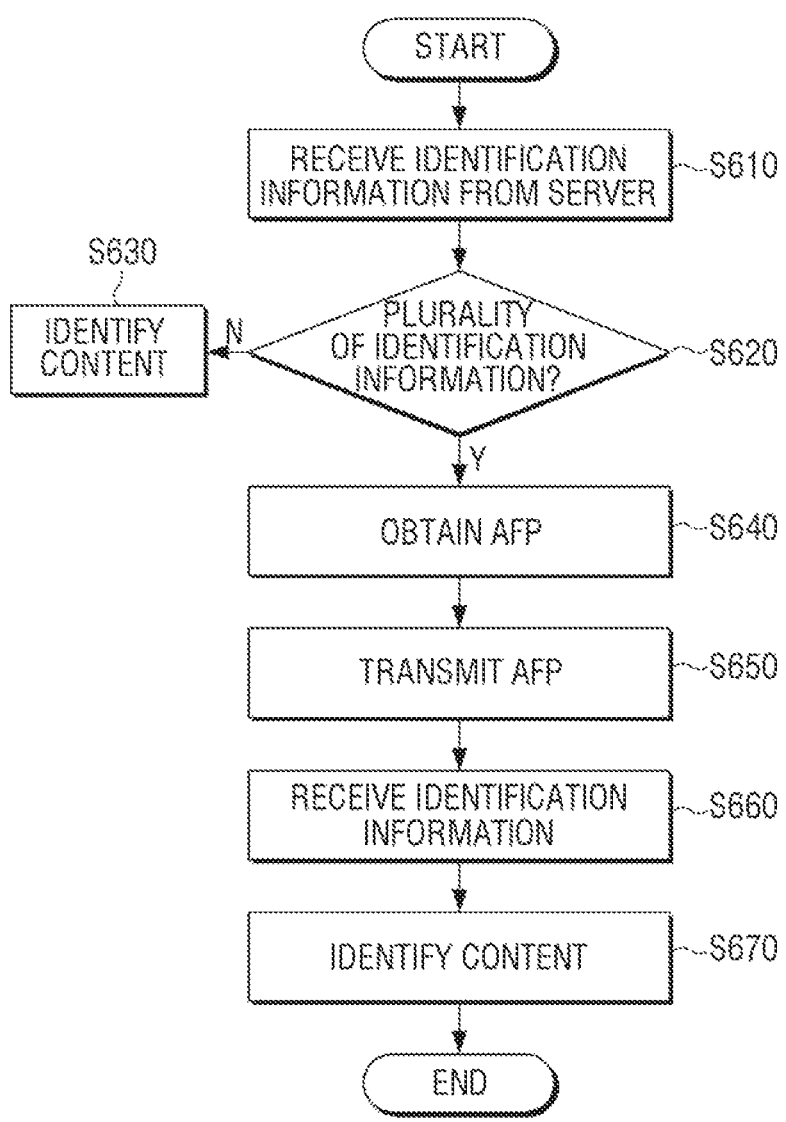
FIG. 6 is a flowchart for explaining a process using audio feature information, if a content is not identified only with video feature information, according to an embodiment.

FIG. 6 is a flowchart for explaining a process using audio feature information, if a content is not identified only with video feature information, according to an embodiment.

The electronic apparatus 100 may receive identification information regarding a content from the server 300 (S610). It may be determined whether the number of pieces of identification information received from the server 300 is more than one. That is, it may be identified whether a plurality of pieces of the same identification information are received from the server 300 (S620). If only one identification information is received from the server 300 (S620-N), the electronic apparatus 100 may recognize that identification information regarding one content is requested, and identify a content being reproduced as the corresponding identification information (S630).

If the plurality of pieces of identification information are received from the server 300 and the plurality of pieces of identification information are the same (S620-Y), the electronic apparatus 100 may obtain the audio fingerprint (AFP) information (S640). This is because the plurality of pieces identification information may be distinguished using the audio fingerprint information.

The electronic apparatus 100 may transmit the obtained audio fingerprint information to the server 300 (S650). For example, assuming that the contents reproduced on Channel 5, Channel 6, and Channel 11 are soccer games, audio signals of Channel 5, Channel 6, and Channel 11 may be different from each other, because commentators may be different from each other, even if the video signals of Channel 5, Channel 6, and Channel 11 are the same. Accordingly, the electronic apparatus 100 may transmit the audio fingerprint information of each channel to the server 300.

The server 300 may obtain content identification information different from each other by comparing the plurality of pieces of audio fingerprint information transmitted from the electronic apparatus 100 with the information stored in each database. For example, the server 300 may obtain a broadcasting station, a channel number, and personal information corresponding to each audio fingerprint information differently and transmit these to the electronic apparatus 100.

The electronic apparatus 100 may receive the plurality of pieces of identification information different from each other from the server 300 (S660) and identify the content (S670).

It is described that the electronic apparatus 100 transmits the audio fingerprint information to the server 300 after receiving the identification information corresponding to the video fingerprint from the server 300, there is no limitation thereto, the electronic apparatus 100 may transmit the video fingerprints and the audio fingerprints regarding Channel 5, Channel 7, and Channel 11, and the server 300 may obtain identification information of contents different from each other corresponding to each audio fingerprint information using the audio fingerprint and transmit the identification information to the electronic apparatus 100, if the plurality of video fingerprints transmitted from the electronic apparatus 100 are identified to be the same.

Figure 7:
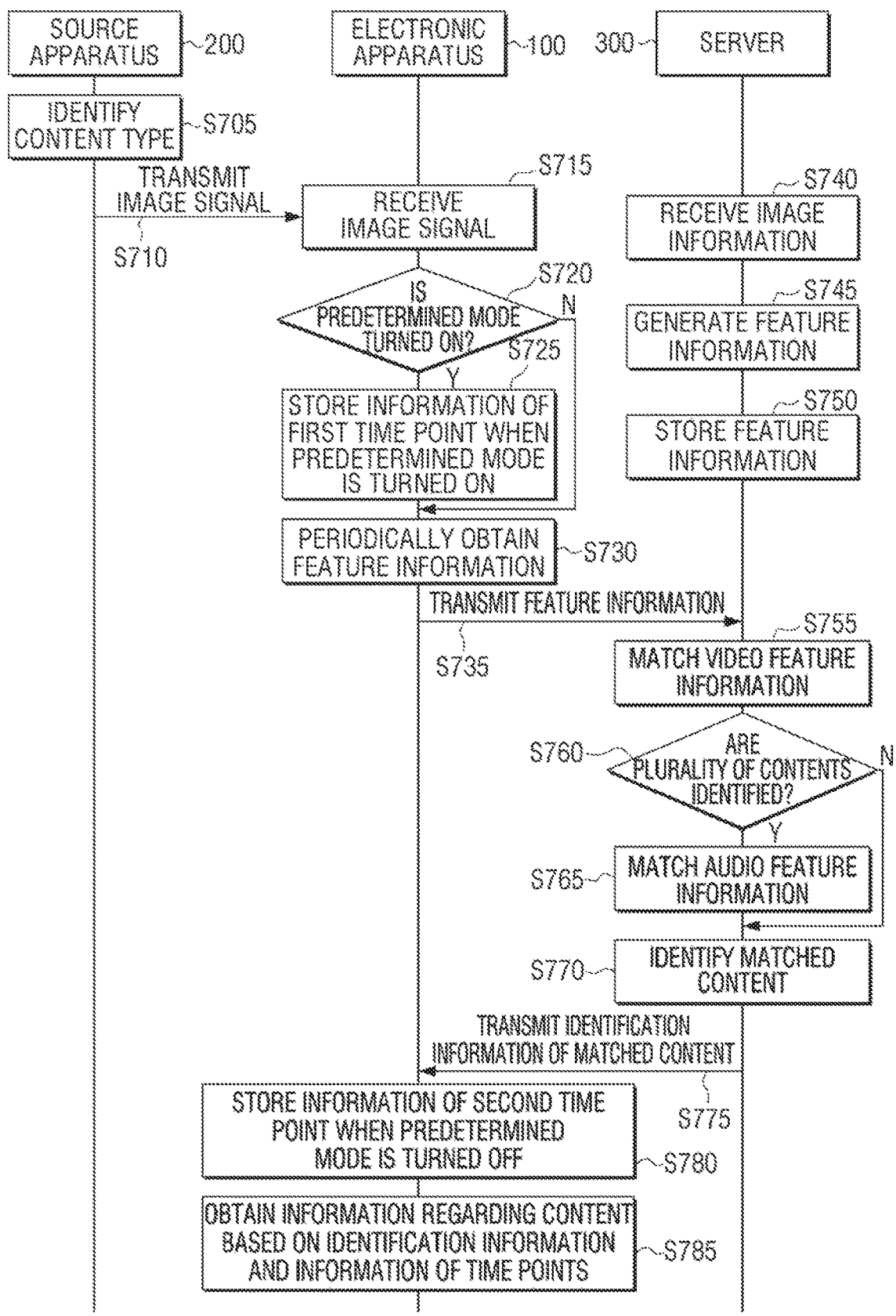
FIG. 7 is a sequence diagram of an electronic apparatus, a source apparatus, and a server, according to an embodiment.

FIG. 7 is a sequence diagram of an electronic apparatus, a source apparatus, and a server, according to an embodiment.

The source apparatus 200 may identify the type of the content to be transmitted to the electronic apparatus 100 (S705) and transmit the image signal to the electronic apparatus 100 (S710). If the content transmitted to the electronic apparatus 100 is identified as a game content, the source apparatus 200 may include the control information for turning on the ALLM in the image signal transmitted to the electronic apparatus 100.

The electronic apparatus 100 may receive the image signal from the source apparatus 200 (S715). The electronic apparatus 100 may identify whether the predetermined mode is turned on by the control information included in the image signal (S720). When it is determined that the predetermined mode is turned on (S720-Y), the electronic apparatus 100 may store the information regarding the first time point when the predetermined mode is turned on (S725).

In addition, when the image signal is received from the source apparatus 200, the electronic apparatus 100 may divide the content included in the image signal into a video signal and an audio signal, and periodically obtain feature information from the video signal and the audio signal (S730). The electronic apparatus 100 may obtain the video fingerprint information from the video signal and obtain the audio fingerprint information from the audio signal.

Then, the electronic apparatus 100 may transmit the feature information obtained for identifying the information regarding the content to the server 300 (S735).

The server 300 may receive the image signal from the source apparatus 200 or an external apparatus, before the electronic apparatus 100 (S740). The server 300 may divide the content included in the image signal into the video signal and the audio signal and generate the video feature information and the audio feature information (S745). The generated feature information may be stored as the video feature information and the audio feature information (S750).

Then, when the feature information is transmitted from the electronic apparatus 100 (S735), the server 300 may match (compare) the video feature information transmitted from the electronic apparatus 100 with information of a database (S755). The server 300 may identify whether the number of pieces of identification information obtained based on the video feature information is more than one (S760). If the number of pieces of identification information is identified to be more than one (S760-Y), in other words, if the identification information is not identified as information for one content, the server 300 may match (compare) the audio feature information transmitted from the electronic apparatus 100 with the information of the database (S765).

The plurality of pieces of identification information using even the audio feature information may be identified as one piece of identification information, and accordingly, the server 300 may identify one matched content and obtain identification information regarding this (S770). Then, the server 300 may transmit the matched content identification information to the electronic apparatus 100 (S775).

The electronic apparatus 100 may obtain the information regarding the second time point when the predetermined mode is turned off and store the information regarding the second time point (S780). Step S780 is illustrated after the identification information is received from the server 300 in FIG. 7, but this is an embodiment, and Step S780 is a step performed at various time points after Step S730 of obtaining the feature information on the electronic apparatus 100.

The electronic apparatus 100 may obtain information regarding the content based on the identification information received from the server 300 and the stored information regarding the first time point and the second time point (S785).

The electronic apparatus 100 may identify the type and the title of the content based on the identification information and identify the reproduction time period and type of the content based on the information regarding the first time point and the second time point.

Figure 8:
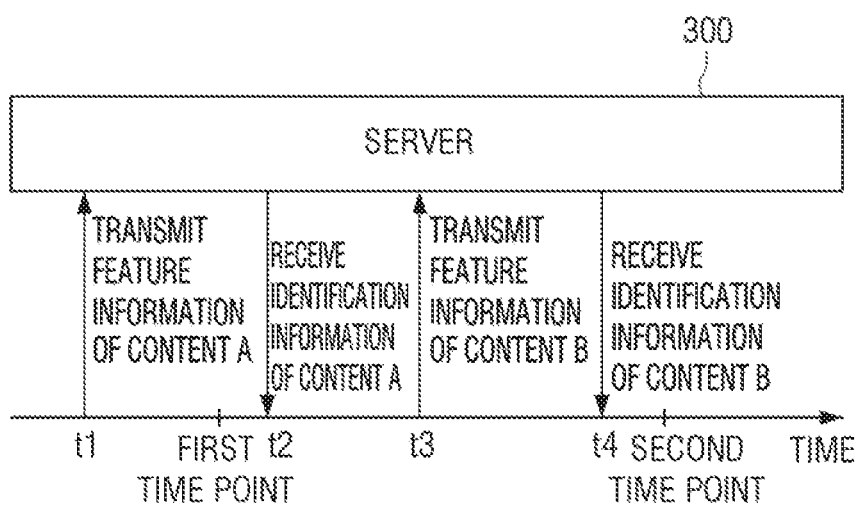
FIG. 8 is a view for explaining identification information based on a time point when feature information is obtained, according to an embodiment.

FIG. 8 is a view for explaining identification information based on a time point when feature information is obtained, according to an embodiment.

The electronic apparatus 100 may determine that a type of content is reproduced between the first time point when the predetermined mode is turned on and the second time point when the predetermined mode is turned off. In this case, if the plurality of pieces of identification information different from each other are received between the first time point and the second time point, the electronic apparatus 100 may identify which content corresponding to which identification information is reproduced between the first time point and the second time point.

For example, the electronic apparatus 100 may obtain the feature information from a content A at a time point t1 which is before the first time point, and transmit the obtained feature information to the server 300. The server 300 may identify the matched content A based on the feature information and transmit identification information of the content A to the electronic apparatus 100. It is assumed that the electronic apparatus 100 may receive the identification information of the content A from the server 300 at a time point t2 which is after the first time point.

In addition, the electronic apparatus 100 may obtain the feature information from a content B at a time point t3 which is after the first time point and transmit the obtained feature information to the server 300. The server 300 may identify the matched content B based on the feature information and transmit identification information of the content B to the electronic apparatus 100. It is assumed that the electronic apparatus 100 may receive the identification information of the content B from the server 300 at a time point t4 which is before the second time point.

In other words, the electronic apparatus 100 may receive the plurality of pieces of identification information from the server 300 between the first time point and the second time point. In this case, the electronic apparatus 100 may identify the identification information corresponding to the feature information obtained between the first time point and the second time point (identification information received at the time point t4) among the plurality of pieces of identification information received from the server 300. The electronic apparatus 100 may identify that the content corresponding to the identification information received at the time point t4 is reproduced between the first time point and the second time point and identify the reproduction time period of the content B.

In addition, even if the t4 which is the time point when the identification information of the content B is received is after the second time point, because the feature information of the content B is obtained between the first time point and the second time point, the electronic apparatus 100 may identify that the content B is reproduced between the first time point and the second time point.

FIG. 9 is a flowchart for explaining a method of controlling an electronic apparatus, according to an embodiment.

When a content is received from the source apparatus 200, the electronic apparatus 100 may obtain feature information of the received content and transmit the feature information to the server 300 (S910).

Herein, the feature information may include any one or any combination of video feature information and audio feature information. The video feature information may be implemented as a video fingerprint and the audio feature information may be implemented as an audio fingerprint.

The electronic apparatus 100 may capture images of a content currently being watched among the received content at predetermined time interval, and obtain the video feature information based on pixel values of the captured images.

In addition, the electronic apparatus 100 may obtain frequency information of an acoustic information of the content currently being watched at the predetermined time interval, and obtain the audio feature information based on the obtained frequency information.

Herein, if the number of pieces of identification information of the content obtained based on the video feature information is more than one, the audio feature information may be information additionally used for obtaining the identification information corresponding to the content currently being watched among the plurality of pieces of identification information.

The electronic apparatus 100 may obtain the video feature information from a predetermined number of recently captured images among the plurality of images captured at the predetermined time interval and transmit the video feature information to the server 300.

The electronic apparatus 100 may receive identification information of the content obtained based on the feature information from the server 300 (S920).

The electronic apparatus 100 may obtain the identification information of the content based on the feature information obtained between the first time point and the second time point among the plurality of pieces of identification information received from the server 300.

If the predetermined mode of the electronic apparatus 100 is turned on according to a signal received from the source apparatus 200, the electronic apparatus 100 may obtain information regarding the first time point when the predetermined mode is turned on (S930).

The signal received from the source apparatus 200 may include control information for allowing the electronic apparatus 100 to turn on or turn off the predetermined mode based on the type of the content provided from the source apparatus 200.

If the type of the content is a game content, the control information may be information provided from the source apparatus 200 and the predetermined mode may be an automatic low-latency mode (ALLM).

The electronic apparatus 100 may obtain information regarding the second time point when the predetermined mode is turned off after the first time point (S940).

The electronic apparatus 100 may obtain the information regarding the displayed content based on the obtained identification information, the information regarding the first time point, and the information regarding the second time point (S950).

The electronic apparatus 100 may identify a title of the displayed content based on the identification information, and identify reproduction time period of the identified content based on the information regarding the first time point and the second time point.

The operations of each step have been described above, therefore, the detailed description thereof will not be repeated.

The methods according to the embodiments of the disclosure described above may be implemented in a form of an application installable in the electronic apparatus of the related art.

In addition, the methods according to the embodiments of the disclosure described above may be implemented simply by the software update or hardware update in the electronic apparatus of the related art.

Further, the embodiments of the disclosure described above may be performed through an embedded server prepared in the electronic apparatus or an external server of the electronic apparatus.

According to an embodiment of the disclosure, the embodiments described above may be implemented as software including instructions stored in machine (e.g., computer)-readable storage media. The machine is an apparatus which invokes instructions stored in the storage medium and is operated according to the invoked instructions, and may include an electronic apparatus according to the disclosed embodiments. In a case in which the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

In addition, according to an embodiment of the disclosure, the methods according to the embodiments disclosed above may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

According to an embodiment of the disclosure, the embodiments described above may be implemented in a recording medium readable by a computer or a similar apparatus using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a machine to execute the processing operations according to the embodiments described above.

The non-transitory computer-readable medium is not a medium storing data for a short period of time such as a register, a cache, or a memory, but means a medium that semi-permanently stores data and is readable by a machine. Examples of the non-transitory computer-readable medium may include a CD, a DVD, a hard disk, a Blu-ray disc, a USB, a memory card, and a ROM.

In addition, each of the elements (e.g., a module or a program) according to embodiments described above may include a single entity or a plurality of entities, and some sub-elements of the abovementioned sub-elements may be omitted or other sub-elements may be further included in the embodiments. Alternatively or additionally, some elements (e.g., modules or programs) may be integrated into one entity to perform the same or similar functions performed by each respective element prior to integration. Operations performed by a module, a program, or other elements, in accordance with the embodiments, may be performed sequentially, in a parallel, repetitive, or heuristically manner, or at least some operations may be performed in a different order, omitted, or may add a different operation.

While embodiments of the disclosure have been shown and described, the disclosure is not limited to the aforementioned embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

As described above, according to embodiments of the disclosure, the electronic apparatus may identify the title of the content currently being displayed.

In addition, if the content reproduced via the electronic apparatus is a game content, the electronic apparatus may identify play time of the game content actually played by a user.

What is claimed is:

1. An electronic apparatus comprising:
a communication interface;
a display; and
a processor configured to:
based on a content being received from a source apparatus via the communication interface, obtain feature information of the received content, and transmit the obtained feature information to a8n external server;
receive, from the external server, identification information of the content, the identification information being obtained based on the transmitted feature information;
based on a predetermined display mode being activated according to a signal that is received from the source apparatus via the communication interface, obtain information regarding a first time point when the predetermined display mode is activated;
based on the predetermined display mode being deactivated, obtain information regarding a second time point when the predetermined display mode is deactivated after the first time point; and
obtain information regarding the content that is displayed via the display, based on the received identification information, the obtained information regarding the first time point, and the obtained information regarding the second time point,
wherein the signal received from the source apparatus includes control information for allowing the electronic apparatus to activate or deactivate the predetermined display mode based on a type of the content received from the source apparatus,
wherein the control information includes instruction information for changing a response time of the display based on the type of the content, and
wherein the predetermined display mode is an automatic low-latency mode (ALLM).

2. The electronic apparatus according to claim 1, wherein the processor is further configured to:
identify a title of the displayed content, based on the identification information received from the external server; and
identify a reproduction time period of the content of which the title is identified, based on the obtained information regarding the first time point and the obtained information regarding the second time point.

3. The electronic apparatus according to claim 1, wherein the processor is further configured to obtain the identification information of the content, based on the feature information that is obtained after the first time point before the second time point, among a plurality of pieces of the identification information received from the external server.

4. The electronic apparatus according to claim 1, wherein the control information is provided from the source apparatus to the electronic apparatus supporting an HDMI standard of a predetermined or higher version.

5. The electronic apparatus according to claim 1, wherein the content is a game content.

6. The electronic apparatus according to claim 1, wherein the feature information comprises any one or any combination of video feature information and audio feature information, and
wherein the processor is further configured to:
capture images of a content currently being watched among the content received from the source apparatus, at a predetermined time interval;
obtain the video feature information, based on pixel values of the captured images;
obtain frequency information of acoustic information of the content currently being watched, at the predetermined time interval; and
obtain the audio feature information, based on the obtained frequency information.

7. The electronic apparatus according to claim 6, wherein, based on a number of pieces of the identification information of the content obtained based on the video feature information being more than one, the audio feature information is additionally used for obtaining identification information corresponding to the content currently being watched among a plurality of pieces of the obtained identification information.

8. The electronic apparatus according to claim 6, wherein the processor is further configured to obtain the video feature information from a predetermined number of recently captured images among the captured images.

9. A method of controlling an electronic apparatus, the method comprising:
based on a content being received from a source apparatus, obtaining feature information of the received content, and transmitting the obtained feature information to an external server;
receiving, from the external server, identification information of the content, the identification information being obtained based on the transmitted feature information;
based on a predetermined display mode of a display of the electronic apparatus being activated according to a signal that is received from the source apparatus, obtaining information regarding a first time point when the predetermined display mode is activated;
based on the predetermined display mode of the display being deactivated, obtaining information regarding a second time point when the predetermined display mode is deactivated after the first time point; and
obtaining information regarding the content that is displayed, based on the received identification information, the obtained information regarding the first time point, and the obtained information regarding the second time point,
wherein the signal received from the source apparatus includes control information for allowing the electronic apparatus to activate or deactivate the predetermined display mode based on a type of the content received from the source apparatus,
wherein the control information includes instruction information for changing a response time of the display based on the type of the content, and
wherein the predetermined display mode is an automatic low-latency mode (ALLM).

10. The method according to claim 9, wherein the obtaining the information regarding the content comprises:
identifying a title of the displayed content, based on the identification information received from the external server; and
identifying a reproduction time of the content of which the title is identified, based on the obtained information regarding the first time point and the obtained information regarding the second time point.

11. The method according to claim 9, further comprising obtaining the identification information of the content, based on the feature information that is obtained after the first time point before the second time point, among a plurality of pieces of the identification information received from the external server.

12. The method according to claim 9, wherein the control information is provided from the source apparatus to the electronic apparatus supporting an HDMI standard of a predetermined or higher version.

13. The method according to claim 9, wherein the content is a game content.

14. The method according to claim 9, wherein the feature information comprises any one or any combination of video feature information and audio feature information, and
wherein the obtaining the feature information comprises:
capturing images of a content currently being watched among the content received from the source apparatus, at predetermined time interval;
obtaining the video feature information, based on pixel values of the captured images;
obtaining frequency information of acoustic information of the content currently being watched, at the predetermined time interval; and
obtaining the audio feature information, based on the obtained frequency information.

15. The method according to claim 14, wherein, based on a number of pieces of the identification information of the content obtained based on the video feature information being more than one, the audio feature information is additionally used for obtaining identification information corresponding to the content currently being watched among a plurality of pieces of the obtained identification information.

16. The method according to claim 14, wherein the obtaining the video feature information comprises obtaining the video feature information from a predetermined number of recently captured images the captured images.

17. A non-transitory computer-readable storage medium storing instructions that, when executed by at least one processor of an electronic apparatus, cause the at least one processor to:
identify whether a predetermined display mode of a display of the electronic apparatus is activated, based on a signal that is received from a source apparatus;
based on the predetermined display mode of the display being identified to be activated, obtain a first time point at which the predetermined display mode of the display is activated;
obtain feature information from the received signal;
transmit the obtained feature information to an external server;
receive, from the external server, identification information of content corresponding to the transmitted feature information;
based on the predetermined display mode of the display being identified to be deactivated, obtain a second time point at which the predetermined display mode of the display is deactivated, after the first time point; and
obtain information of the content that is displayed via the display, from a portion of the received identification information, the portion corresponding to a time period from the obtained first time point to the obtained second time point,
wherein the signal received from the source apparatus includes control information for allowing the electronic apparatus to activate or deactivate the predetermined display mode based on a type of the content received from the source apparatus,
wherein the control information includes instruction information for changing a response time of the display based on the type of the content, and
wherein the predetermined display mode comprises an automatic low-latency mode (ALLM), and the information of the content comprises either one or both of a title and a type.

18. The non-transitory computer-readable storage medium of claim 17, wherein the instructions, when executed by the at least one processor, cause the at least one processor to obtain the identification information of the content, based on the feature information that is obtained after the first time point before the second time point, among a plurality of pieces of the identification information received from the external server.

* * * * *